US010658863B2

(12) United States Patent
Shirani-Mehr et al.

(10) Patent No.: US 10,658,863 B2
(45) Date of Patent: May 19, 2020

(54) DOMINANT POWER RECEIVING UNIT SELECTION

(71) Applicant: Intel Corporation, Santa Clara, CA (US)

(72) Inventors: Hooman Shirani-Mehr, Portland, OR (US); Ahmad Khoshnevis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/184,703

(22) Filed: Nov. 8, 2018

(65) Prior Publication Data

US 2019/0181673 A1 Jun. 13, 2019

Related U.S. Application Data

(63) Continuation of application No. 14/977,422, filed on Dec. 21, 2015, now abandoned.

(60) Provisional application No. 62/238,238, filed on Oct. 7, 2015.

(51) Int. Cl.
| | |
|---|---|
| *H02J 7/00* | (2006.01) |
| *H02J 7/02* | (2016.01) |
| *H02J 50/80* | (2016.01) |
| *H04W 76/14* | (2018.01) |
| *H04W 4/80* | (2018.01) |
| *H02J 50/10* | (2016.01) |
| *H02J 50/40* | (2016.01) |
| *H02J 50/90* | (2016.01) |

(52) U.S. Cl.
CPC .............. *H02J 7/025* (2013.01); *H02J 50/10* (2016.02); *H02J 50/40* (2016.02); *H02J 50/80* (2016.02); *H02J 50/90* (2016.02); *H04W 4/80* (2018.02); *H04W 76/14* (2018.02)

(58) Field of Classification Search
CPC ...................................................... H02J 7/025
USPC ........................................................ 320/108
See application file for complete search history.

(56) References Cited

U.S. PATENT DOCUMENTS

2015/0380971 A1* 12/2015 Priev ..................... H02J 7/0027
320/108
2018/0138758 A1* 5/2018 Jung ..................... H02J 7/0021

* cited by examiner

*Primary Examiner* — Edward Tso
*Assistant Examiner* — Ahmed H Omar
(74) *Attorney, Agent, or Firm* — Eversheds Sutherland (US) LLP (57) ABSTRACT

This disclosure describes systems, methods, and apparatus related to dominant power receiving unit selection. A device may determine a presence of a first device of one or more devices on a charging area of the device, the charging area including a power transmitting surface. The device may establish a connection with the first device using one or more communication protocols. The device may identify one or more parameters associated with the first device using the established connection. The device may determine that the first device is a dominant device based at least in part on the one or more parameters.

20 Claims, 8 Drawing Sheets

| Field | Octets | Description | Use | Units |
|---|---|---|---|---|
| Optional fields validity | 1 | Defines which optional fields are populated | Mandatory | |
| $V_{RECT}$ | 2 | DC voltage at the output of the rectifier. | Mandatory | mV |
| $I_{RECT}$ | 2 | DC current at the output of the rectifier. | Mandatory | mA |
| $V_{OUT}$ | 2 | Voltage at charge/battery port | Optional | mV |
| $I_{OUT}$ | 2 | Current at charge/battery port | Optional | mA |
| Temperature ratio | 1 | $(t - T_{MIN}) / (T_{MAX} - T_{MIN})$ | Optional | None |
| Current ratio | 1 | ratio of PRU's $I_{RECT}$ to $I_{MAX}$ | Optional | None |
| $V_{RECT\_MIN\_DYN}$ | 2 | The current dynamic minimum rectifier voltage desired | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | The current dynamic maximum rectifier voltage desired | Optional | mV |
| PRU alert | 1 | Warnings | Mandatory | Bit field |
| Tester Command | 1 | PTU Test Mode Command | Optional | Bit Field |
| RFU | 2 | Undefined | | |

| Real value of $(t - T_{MIN}) / (T_{MAX} - T_{MIN})$ | Quantized value(Binary) |
|---|---|
| 0.00 – 0.01 | 00000000 |
| 0.01 – 0.02 | 00000001 |
| 0.02 – 0.03 | 00000010 |
| 0.03 – 0.04 | 00000011 |
| ... | ... |
| 0.98 – 0.99 | 01100011 |
| 0.99 – 1.00 | 01100100 |

FIG. 4B

| Real value of $I_{RECT} / I_{MAX}$ | Quantized value(Binary) |
|---|---|
| 0.00 – 0.01 | 00000000 |
| 0.01 – 0.02 | 00000001 |
| 0.02 – 0.03 | 00000010 |
| 0.03 – 0.04 | 00000011 |
| ... | ... |
| 0.98 – 0.99 | 01100011 |
| 0.99 – 1.00 | 01100100 |

DOMINANT POWER RECEIVING UNIT SELECTION

CROSS-REFERENCE TO RELATED APPLICATIONS

This application is a continuation of U.S. application Ser. No. 14/977,422 filed Dec. 21, 2015, which claims the benefit of U.S. Provisional Application No. 62/238,238 filed Oct. 7, 2015, the disclosures of which is incorporated herein by reference as if set forth in full.

TECHNICAL FIELD

This disclosure generally relates to systems and methods for wireless charging stations, more particularly, to coil currents for multiple power receiving devices.

BACKGROUND

Wireless charging or inductive charging uses a magnetic field to transfer energy between devices. Wireless charging may be implemented at a charging station. Energy is sent from one device to another device through an inductive coupling. The inductive coupling is used to charge batteries or run a device. Power is delivered through non-radiative, near field, magnetic resonance from a power transmitting unit (PTU) to a power receiving unit (PRU).

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A power transmitting unit (PTU) may transmit power wirelessly to charge one or more power receiving units (PRUs). The PTU's current conducted through its coil generates a magnetic field. All of the PRUs that are placed in this magnetic field convert the magnetic field into a voltage that is used for powering the device or charging the battery. With the advancement in computing devices, an increasing number of devices, such as tablets, phablets, and laptops, may also require wireless charging. The size of these devices may result in increased power delivery requirements. Higher power devices with large form factors (such as laptop PCs, tablets, etc.) may require higher current as compared to a small device. Whenever there are more than one PRU, there may be variation in current conducted through the PTU's coil. The current variation results in changes in the voltage at the PRUs. However, not all PRUs are affected the same way. The voltage variation in the PRU depends on the size of its receiving coil, the location on the charge area, and some of the internal components. The one or more PRUs placed in the PTU's magnetic field area send back their operation information to the PTU. Such information may include a PRU's rectifier voltage and the rectifier current, among other parameters. It is understood that the PRU's rectifier voltage is the DC voltage that is used for powering the device or charging the battery.

Example embodiments of the present disclosure relate to systems, methods, and devices for selecting a dominant PRU between one or more PRUs being charged by a PTU. A PRU may be classified by category information. A PRU's category information may be determined by various factors, such as specifications, user preferences, manufacturing information, size of the PRU device, power consumption, operational requirements, voltage requirements, current requirements, or the like. In some embodiments, the category information may be shared with the PTU in order to select a dominant PRU from the one or more PRUs being charged by the PTU. In some embodiments, a PRU may send its internal parameter V_rect_set to the PTU. The value of V_rect_set is a PRU specific parameter that may indicate the PRU's desired rectifier voltage at which the PRU has an optimized performance. The PTU may adjust the current conducted through its coil such that the dominant PRU rectifier voltage is within 3% to 5% of the dominant PRU internal parameter V_rect_set. The selection of the dominant PRU may be based at least in part on one or more criteria associated with the one or more PRUs. The criteria may include at least in part a temperature criterion, a current criterion, and/or a voltage gap criterion. These criteria may be determined based on the PRU's category information. The criteria may be utilized to achieve the goal of maximizing the selection efficiency of a dominant PRU relative to other PRUs that may be in the proximity of the charging area of a PTU.

Figure 1:
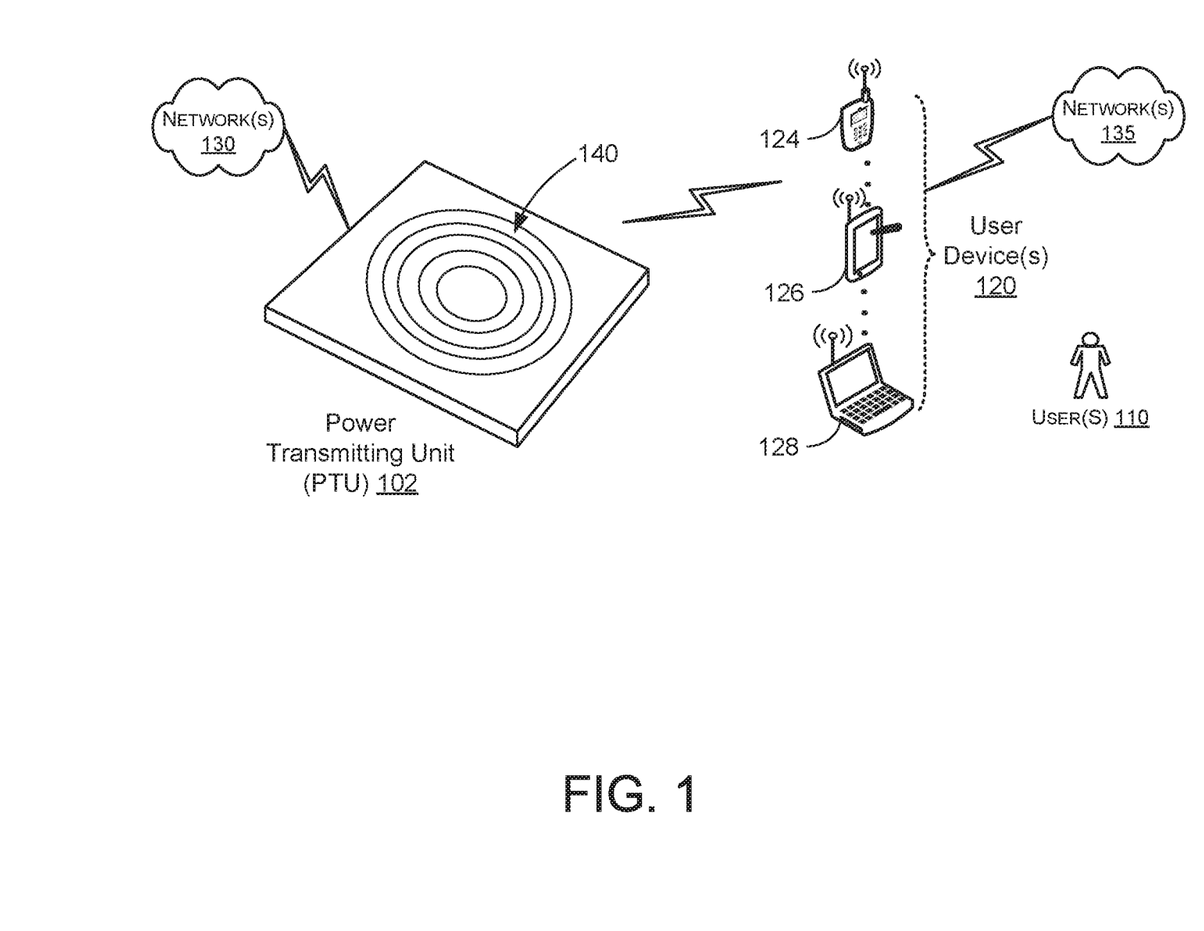
FIG. 1 depicts a network diagram illustrating an example network environment of a dominant PRU selection, in accordance with one or more example embodiments of the present disclosure.

FIG. 1 depicts a network diagram illustrating an example network environment of a dominant PRU selection, in accordance with one or more example embodiments of the present disclosure, which may include one or more user devices 120 and a wireless power transmitting device (PTU) 102. The one or more user devices 120 may be power receiving units (PRUs) operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, a wearable wireless device (e.g., bracelet, watch, glasses, ring, etc.), and so forth. While FIG. 1 shows PRUs including laptop 128 and smart devices 124 and 126, the disclosed principles are not limited thereto and may include any device capable of wireless charging. In some embodiments, the user devices 120 and the PTU 102 may include one or more computer systems similar to that of the functional diagram of FIG. 6 and/or the example machine/system of FIG. 7.

One or more illustrative user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, a wearable wireless device (e.g., bracelet, watch, glasses, ring, etc.), and so forth.

Any of the user device(s) 120 (e.g., user devices 124, 126, 128), and the PTU 102 may be configured to communicate with each other directly or via one or more communications networks 130 and/or 135 wirelessly or wired. The direct communication may include Bluetooth Low Energy (BLE), in-band modulation, or the like. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and the PTU 102 may include one or more communications antenns. Communications antenna may be any suitable type of antenna corresponding to the communication protocols used by the user device(s) 120 (e.g., user devices 124, 126, 128), and the PTU 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128) and the PTU 102 may include any suitable radio and/or transceiver for transmitting and/or receiving radio frequency (RF) signals in the bandwidth and/or channels corresponding to the communication protocols utilized by any of the user device(s) 120 and the PTU 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHZ channels (e.g., 802.11ad). In some embodiments, non-Wi-Fi protocols may be used for communication between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communication protocols. The radio component may further include a low noise amplifier (LNA), additional signal amplifiers, an analog-to-digital (A/D) converter, one or more buffers, and a digital baseband.

In one embodiment, the PTU 102 may include a transmitting coil (e.g., coil 140), and the PRUs (e.g., user devices 120) may include a receiving coil. For example, energy may be transmitted from the transmitting coil to the receiving coil, by electromagnetic induction between the two coils. This may cause the transmission of charging power from the PTU to the PRU in response to determining that the PRU is located within the charging area. The PTU may communicate with a PRU to receive information, such as identification information, power received, power needed, location, etc.

The PRUs (e.g., user device(s) 120) may be divided by categories, based on one or more requirements. The one or more requirements may include temperature, current, voltage, power, size of the PRUs, etc. The categories of PRUs may be parameterized by the maximum power delivered out of the PRU resonators. For example, a category 1 PRU may be directed to lower power devices (e.g., Bluetooth headsets). Category 2 PRUs may be directed to devices with power output of about 3.5 W. Category 3 PRUs may be directed to devices with power output of about 6.5 W. Categories 4, 5, and 6 PRUs may be directed to higher power devices (e.g., tablets, netbooks, and laptops) and may have a power output of about 37.5 W. It is understood that the above are only examples and that other categories may be defined for various PRUs based on various requirements.

In one embodiment, a PRU may advertise its category information using one or more communication protocols. For example, the PRU may utilize communication protocols, such as Bluetooth Low Energy (BLE), in-band modulation, or the like, to advertise or transfer its PRU category information to the PTU. The PRU category information may contain static or dynamic PRU parameters. It is understood that although advertisement is done through BLE or in-band modulation, any other communication protocols that may be used for communicating between two devices may be used.

In some examples, when one or more PRUs are being charged by a PTU, the PTU may adjust its coil current (ITX_coil) during power transfer to the one or more PRUs. The adjustment may be based on algorithms that take into account system efficiency and that have a minimal difference in the PRU's rectifier voltage. These algorithms may work well when several PRUs from same category are placed on a PTU and consequently have similar power requirements. However, when the PRUs are from different categories, it may be necessary to determine a "dominant PRU." Currently, a "dominant PRU" is defined as the PRU consuming the highest percentage of its rated output power ($V_{RECT} \times I_{RECT}/P_{RECT\_MAX}$), where $V_{RECT}$ is a rectifier voltage of a PRU, $I_{RECT}$ is a rectifier current of the PRU, and $P_{RECT\_MAX}$ is a maximum rectifier power for the PRU. However, defining the dominant PRU between different categories of PRUs may be more difficult and, as a result, the PTU may have difficulty in optimizing the system while meeting PRU current, voltage, and temperature requirements. It is understood that these requirements may be based on standard specifications, preferences, a system administrator, or other requirements.

In one or more embodiments, a dominant PRU may be determined based at least in part on one of a temperature criterion, a current criterion, and/or a voltage gap criterion. These criteria may be determined based, for example, on the category of the PRU or other information. For example, a PTU may select a PRU as a dominant PRU based on the PRU's minimum and maximum temperatures. It is understood that this is one example and that other examples of temperature criteria may be employed when determining a dominant PRU.

Figure 2:
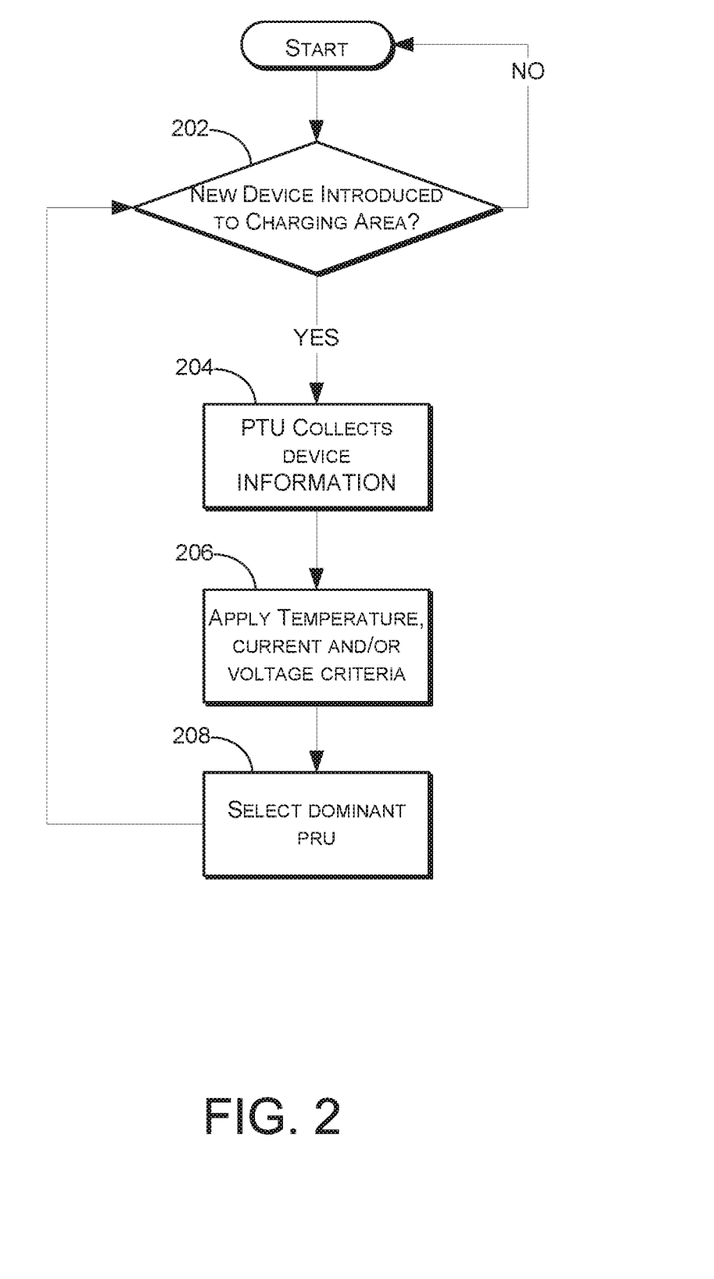
FIG. 2 depicts an illustrative flow diagram for a dominant PRU determination based on one or more criteria, in accordance with one or more embodiments of the disclosure.

FIG. 2 depicts an illustrative flow diagram for a dominant PRU determination based on one or more criteria, in accordance with one or more embodiments of the disclosure.

In general, when serving (e.g., charging) one or more PRUs, a PTU may determine that one of the one or more PRUs is a dominant PRU. Consequently, the PTU may adjust its coil current based on that determination.

In one embodiment, in order for a PTU to determine a dominant PRU, the PRU parameters may be measured at the PRU, and sent to the PTU through one or more communication techniques, such as Bluetooth Low Energy (BLE), near field communication, Wi-Fi, or any other communication technique suitable for facilitating communication between a PTU and a PRU. Some of these PRU parameters may be based at least in part on the temperature, current, and/or voltage of the PRU. These PRU parameters may be represented as numeral values that may be measured at the PRU and communicated to the PTU. These numeral values may be integer parameter values or non-integer parameter values. For non-integer (e.g., real) parameter values, a PRU may need to quantize the non-integer parameter values before sending them to the PTU by using any of the above communication techniques. It is understood that quantization is the process of mapping a large set of input values to a (countable) smaller set.

In one embodiment, when selecting a dominant PRU, a PTU may initiate the process by determining the presence of any new PRUs introduced to a charging area of the PTU (block 202). It is understood that when a PRU is introduced to a charging area of the PTU, the PRU may be in proximity or in contact with the charging area of the PTU. When a new PRU is introduced to the charging area of the PTU, the PRU may advertise one or more parameters associated with the PRU. Consequently, the PTU may receive these parameters from the PRU (block 204). Based at least in part on the received parameters, the PTU may employ one or more criteria in order to determine the dominant PRU from the one or more PRUs that are introduced to the charging area of the PTU (block 206). The one or more criteria may include a temperature ratio criterion, a current ratio criterion, and/or a voltage gap criterion.

In one embodiment, the temperature ratio criterion may be employed by the PTU to select the PRU with the highest value of $(t-T_{MIN})/(T_{MAX}-T_{MIN})$, as the dominant PRU, where $t$ is the current PRU temperature and $T_{MIN}$ and $T_{MAX}$ are minimum and maximum PRU temperatures. This temperature ratio criterion takes into consideration the current PRU temperature and compares it to the maximum and minimum temperatures that may be specified by the PRU. For example, a PRU may have a certain tolerance for a minimum temperature and a maximum temperature. That is, a PRU may not operate or fail below the minimum temperature or above the maximum temperature. It is understood that the above is one example of a temperature ratio criterion and that other temperature ratio criteria may be envisioned.

In another embodiment, the current ratio criterion may be employed by the PTU to select the PRU with highest $I_{RECT}$ to $I_{MAX}$ ratio as a dominant PRU, where $I_{RECT}$ is a rectifier current of the PRU. That is, the PTU may divide the $I_{RECT}$ by the $I_{MAX}$ of the PRU in question. The $I_{MAX}$ is the maximum current specified by the PRU. For example, the PRU may not operate above a maximum current (e.g., $I_{MAX}$). The PRU may send the current ratio to the PTU during the introduction of the PRU to the charging area of the PTU, and/or the current ratio may be sent to the PTU dynamically at various intervals after the introduction of the PRU to the charging carrier of the PTU. The various intervals may be determined by a system administrator, the manufacturer of the PRU, user preference, etc. Further, the current ratio may be sent to the PTU whenever a certain condition is met. It is understood that the above is one example of a current ratio criterion and that other current ratio criteria may be envisioned.

In one embodiment, a PTU may employ a voltage gap criterion in order to select a dominant PRU. The PTU may determine that the dominant PRU is the PRU with smallest value of $V_{RECT\_HIGH}-V_{RECT}$, where, $V_{RECT}$ is a rectifier voltage of a PRU and $V_{RECT\_HIGH}$ is a high rectifier voltage of a PRU. The $V_{RECT\_HIGH}$ and $V_{RECT}$ may be static or dynamic voltage values that may be determined by the PRU and may be shared with the PTU. It is understood that the PRU may send the $V_{RECT\_HIGH}$ and $V_{RECT}$ to the PTU during the introduction of the PRU to the charging area of the PTU, and/or the current ratio may be sent to the PTU dynamically at various intervals after the introduction of the PRU to the charging carrier of the PTU. The various intervals may be determined by a system administrator, the manufacturer of the PRU, user preference, etc. Further, the current ratio may be sent to the PTU whenever a certain condition is met. It is understood that the above is one example of a voltage gap criterion and that other voltage gap criteria may be envisioned.

In one embodiment, the PTU may select the dominant PRU based at least in part on one or more of the above criteria (block 208).

Figure 3:
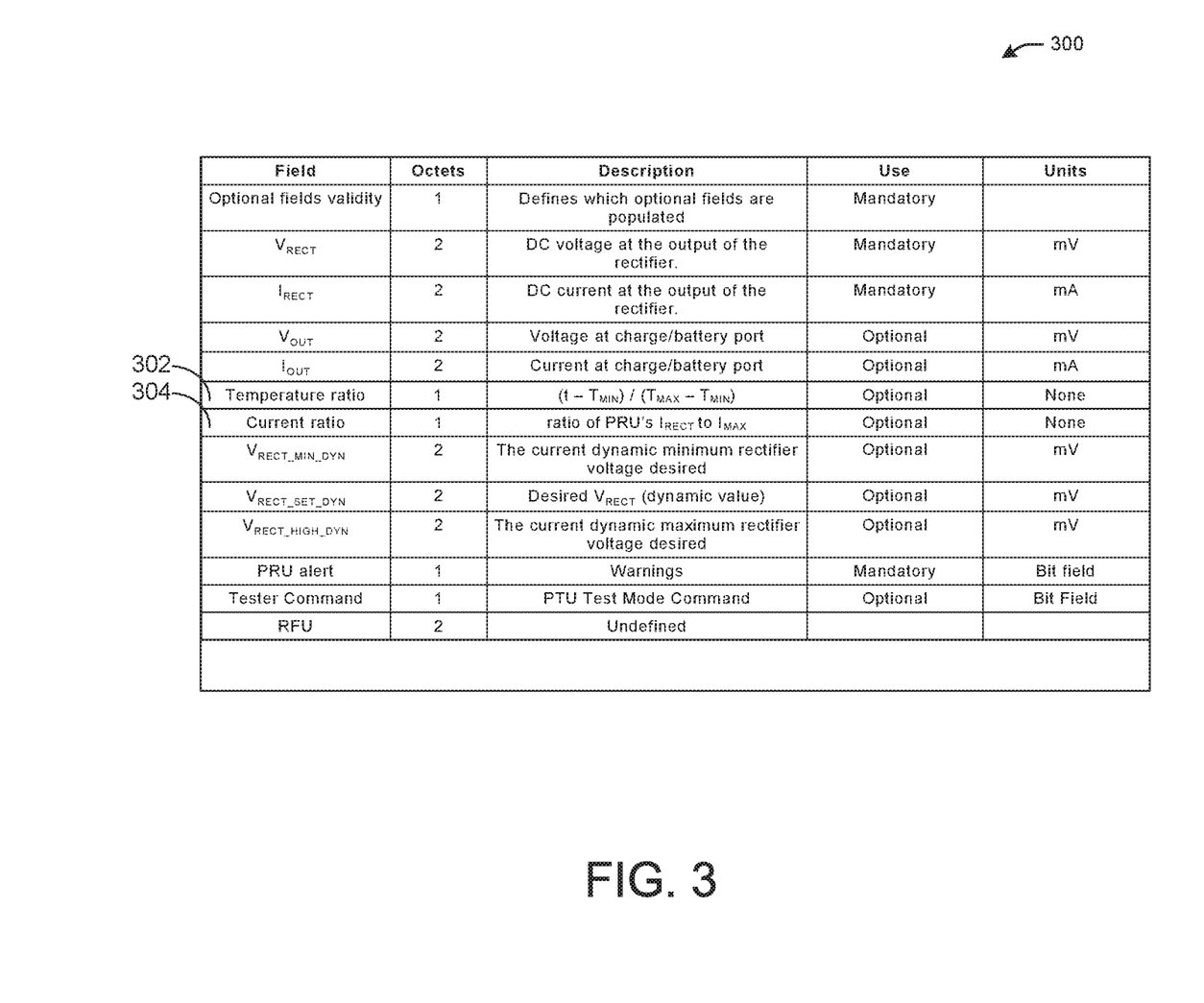
FIG. 3 depicts an illustrative PRU parameter table, in accordance with one or more embodiments of the disclosure.

FIG. 3 depicts an illustrative PRU parameter table, in accordance with one or more embodiments of the disclosure.

In one embodiment, one or more parameters associated with temperature, current, and/or voltage of a PRU may be communicated from the PRU to a PTU when the PRU is introduced to the charging area of the PTU. Further, these one or more parameters may be communicated at various intervals after the introduction of the PRU to the charging area of the PTU.

In one embodiment, the PTU may determine values of temperature, current ratio, and voltage of one or more PRUs based at least in part on the one or more parameters received from the one or more PRUs. The PTU may utilize the one or more parameters to employ one or more criteria to determine the dominant PRU. A PRU may maintain a table (e.g., Table 300) that may include, at least in part, a temperature ratio field row 302 and a current ratio field row 304. The temperature ratio field row 302 may contain a determination of a current temperature of the PRU in association with the minimum temperature and the maximum temperature specified by the PRU. In some embodiments, the temperature ratio field and/or the current ratio may be optional for mandatory values that may be communicated from the PRU to the PTU. These fields may have a predetermined field size (e.g., 1 octet). Table 300 may be maintained by the PRU and may be shared with the PTU at various intervals when communication is established between the PTU and the PRU. Further, the PTU may maintain Table 300 as the one or more parameters are received from the PRU at various intervals. At least some of the one or more parameters may be updated instantaneously or may be updated at predetermined intervals, such as at the time of introduction to the charging area of the PTU or at later times. It is understood that the one or more parameters may be dynamically communicated at various intervals after the introduction of the PRU to the charging carrier of the PTU. The various intervals may be determined by a system administrator, the manufacturer of the PRU, user preference, etc. Further, the current ratio may be sent to the PTU whenever a certain condition is met.

Figure 4A:
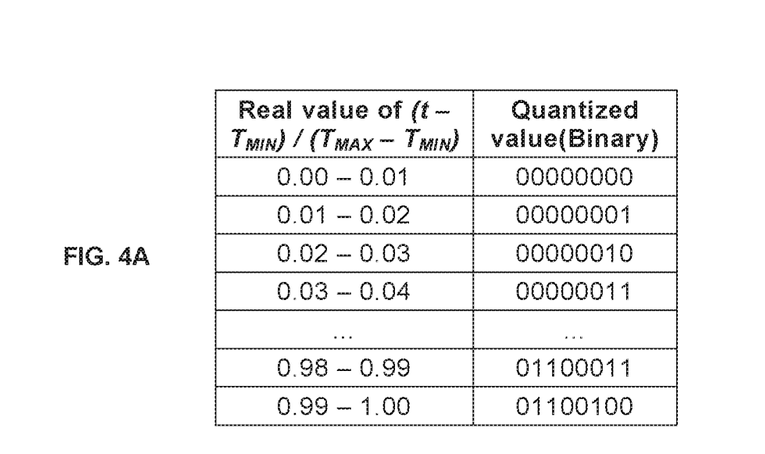
FIGS. 4A and 4B depict illustrative quantization tables, in accordance with one or more embodiments of the disclosure.
Figure 4B:
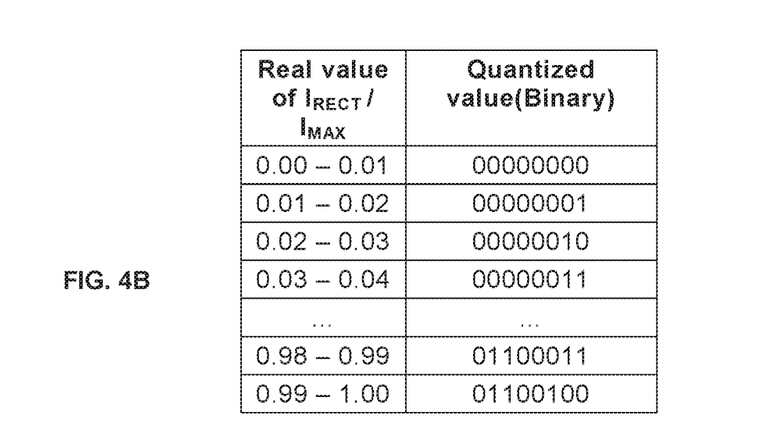

FIGS. 4A and 4B depict illustrative quantization tables of temperature and current PRU values, in accordance with one or more embodiments of the disclosure.

In one embodiment, a PRU may determine temperature and current ratios and may share that information with a PTU in the form of parameters. The temperature and current ratios may be real values. Consequently, the temperature and current ratios may be quantized at the PRU before being sent to the PTU. In other words, a quantized value may be determined for each real value of temperature and/or current ratios that may be determined at the PRU. In some embodiments, the quantization tables may be defined in order to maintain the quantized values for various ranges of real values associated with the temperature and/or current ratios. The quantized values may be represented in binary form and may be represented by one or more bits. For example, the number of bits may be defined based on the desired resolution when communicating the real values of the temperature and/or current ratios to the PTU. For example, as shown in FIG. 4A, a quantization table for the temperature ratio may be determined to represent various quantized values of temperatures that may be communicated to the PTU. The various quantized values may be instantaneous or may be determined at various time periods. For example, a PRU may determine instantaneous values associated with the temperature criterion, $(t-T_{MIN})/(T_{MAX}-T_{MIN})$, that may be communicated to the PTU in the form of binary codes (e.g., in 8-bit format).

FIG. 4B depicts an illustrative table of quantized values associated with real values of a current criterion. That is the ratio of $I_{RECT}$ to $I_{MAX}$ may be determined by the PRU, which may result in real values as opposed to integer values. The real values of the $I_{RECT}$ to $I_{MAX}$ ratio may be mapped quantized values that may be communicated in a binary form to the PTU at various intervals. It is understood that the various intervals may be determined by a system administrator, the manufacturer of the PRU, user preference, etc. Further, the current ratio may be sent to the PTU whenever a certain condition is met. For example, if the PRU determines that the $I_{RECT}$ to $I_{MAX}$ ratio is equal to a value within a certain range (e.g., 0.02-0.03), the PRU may utilize the corresponding quantized value in binary form (e.g., 00000010), as shown in FIG. 4B. Consequently, the quantized value in binary form (e.g., 00000010) may be communicated to the PTU. The PTU may convert the quantized value (e.g., 00000010) to a real value that may be utilized when comparing other $I_{RECT}$ to $I_{MAX}$ ratios from other PRUs that may be introduced to the PTU in order to determine which of these PRUs is the dominant PRU. In other embodiments, the PTU may utilize the quantized value (e.g., 00000010) directly in order to compare with other quantized values received from other PRUs when determining the dominant PRU. It is understood that the above is only an example of a quantized value that may be communicated by a PRU and utilized by the PTU when determining a dominant PRU and that other quantized values may be used.

Figure 5A:
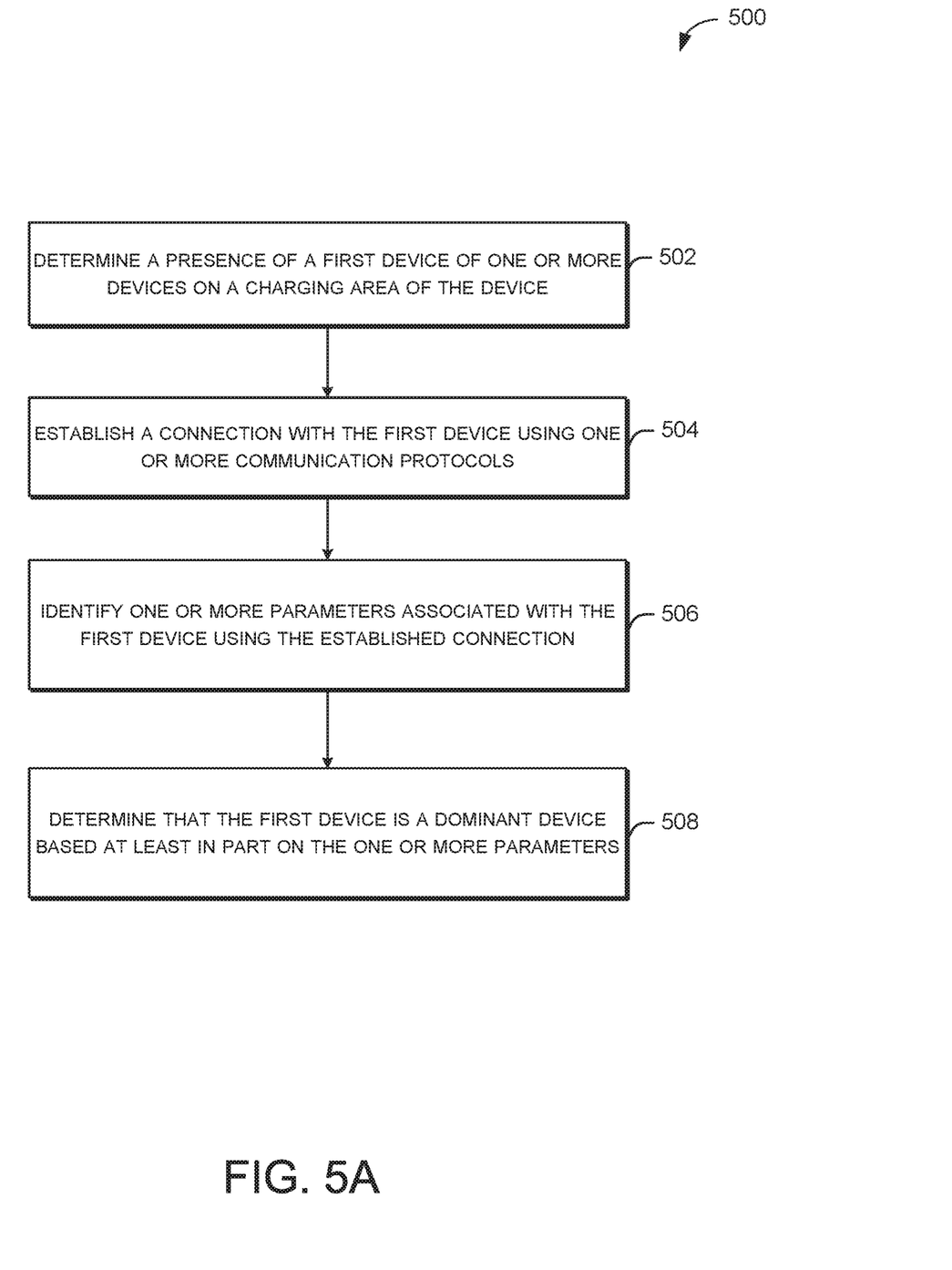
FIG. 5A illustrates a flow diagram of an illustrative process for a dominant PRU selection in accordance with one or more embodiments of the disclosure.

FIG. 5A illustrates a flow diagram of an illustrative process 500 for a dominant PRU selection in accordance with one or more embodiments of the disclosure.

At block 502, a PTU may determine a presence of a device, such as a power receiving unit (PRU) on (or in proximity of) a charging area of the PTU, the charging area including a power transmitting surface. In some embodiments, the PRU device may not necessarily touch the PTU charging area. It may be enough to place the PRU in proximity of the PTU in order for the wireless charging to take place.

At block 504, the PTU may establish a connection with PRU using one or more communication protocols. Establishing a connection may include performing a handshake procedure by which the two devices (PTU and PRU) initiate communication with each other in order to establish a session, in which these devices can exchange any desired information. For example, the handshake procedure may be used for exchanging identification information between the PRU and the PTU. The one or more communication protocols include at least one of a Bluetooth Low Energy (BLE), near field communication (NFC), in-band modulation, or Wi-Fi, or any other communication protocols that may be used for communicating between two devices.

At block 506, the PTU may identify one or more parameters associated with the PRU using the established connection. For example, the PTU may receive from a PRU the one or more parameters when the PRU is introduced to the charging area of the PTU. The one or more parameters may include temperature parameters, current parameters, or voltage parameters. For example, the temperature parameters may include a minimum temperature, a maximum temperature, or an instantaneous temperature of the PRU. The minimum temperature and the maximum temperature may be determined by various factors, such as category of the PRU, specifications, manufacturing information, size of the PRU, etc. The instantaneous temperature may be determined at various intervals. These various temperature parameters may be used to evaluate a temperature ratio criterion that may permit the PTU to determine which of the PRUs introduced to its charging area is a dominant PRU. The temperature ratio criterion may be employed by the PTU to select the PRU with the highest value of $(t-T_{MIN})/(T_{MAX}-T_{MIN})$, as the dominant PRU, where t is the current PRU temperature, and $T_{MIN}$ and $T_{MAX}$ are minimum and maximum PRU temperatures.

The current parameters may also be used to determine whether the PRU is a dominant PRU. For example, rectifier current and maximum current values of a PRU may be used to evaluate a current ratio criterion that may permit the PTU to determine which of the PRUs introduced to its charging area is a dominant PRU. The current ratio criterion may be employed by the PTU to select the PRU with highest $I_{RECT}$ to $I_{MAX}$ ratio as a dominant PRU, where $I_{RECT}$ is a rectifier current of the PRU. That is, the PTU may divide the $I_{RECT}$ by the $I_{MAX}$ of the PRU in question. The $I_{MAX}$ is the maximum current specified by the PRU. For example, the PRU may not operate above a maximum current (e.g., $I_{MAX}$). The PRU may send the current ratio to the PTU during the introduction of the PRU to the charging area of the PTU, and/or the current ratio may be sent to the PTU dynamically at various intervals after the introduction of the PRU to the charging carrier of the PTU. The various intervals may be determined by a system administrator, the manufacturer of the PRU, user preference, etc. Further, the current ratio may be sent to the PTU whenever a certain condition is met. Additionally/alternatively, the voltage parameters may be used to determine whether the PRU is a dominant PRU. For example, the PTU may determine that the dominant PRU is the PRU with smallest value of $V_{RECT\_HIGH}-V_{RECT}$, where, $V_{RECT}$ is a rectifier voltage of a PRU and $V_{RECT\_HIGH}$ is a high rectifier voltage of a PRU.

At block 508, the PTU may determine that the PRU is a dominant device based at least in part on the one or more parameters.

Figure 5B:
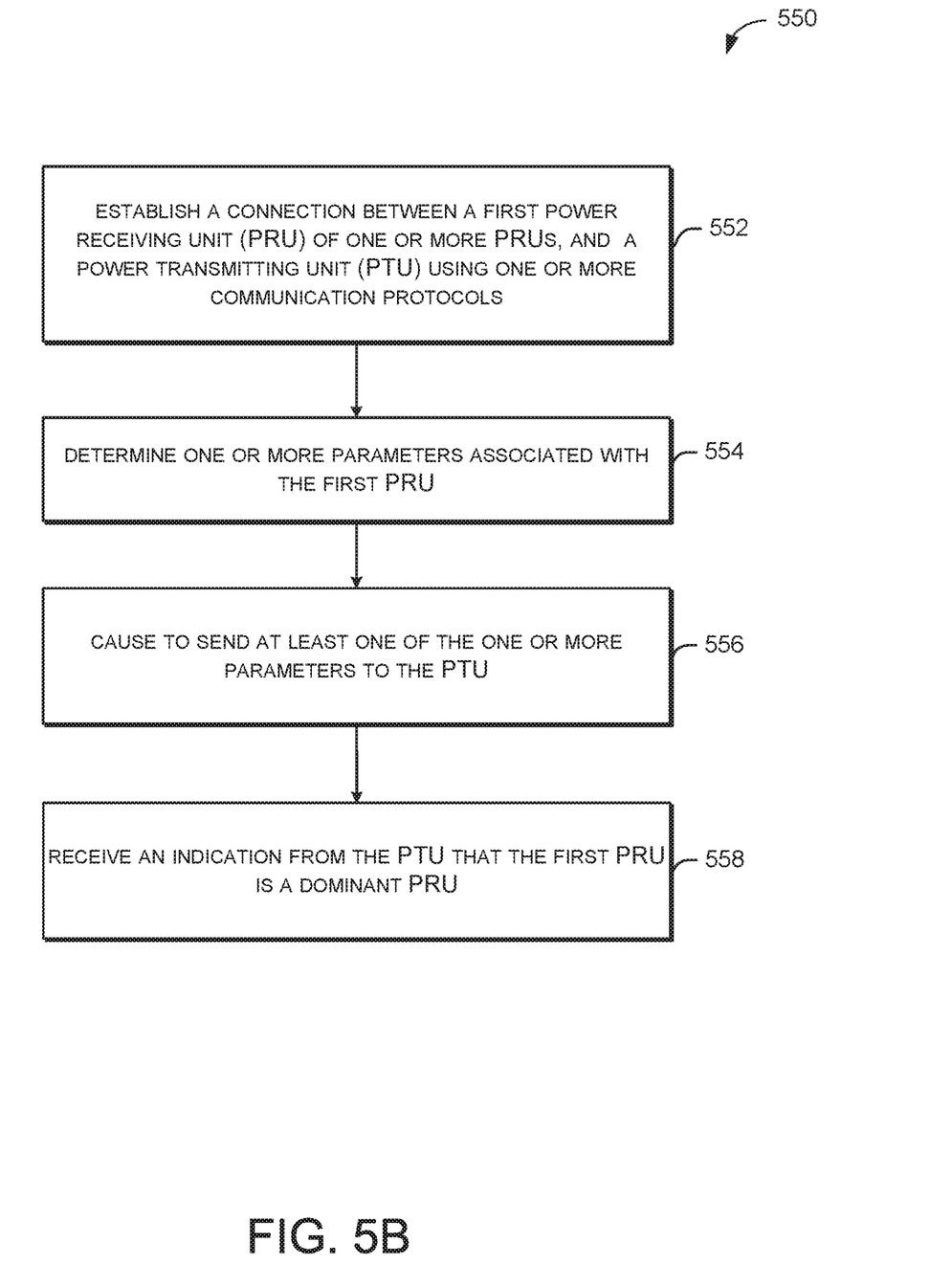
FIG. 5B illustrates a flow diagram of an illustrative process for a dominant PRU selection in accordance with one or more embodiments of the disclosure.

FIG. 5B illustrates a flow diagram of an illustrative process 550 for a dominant PRU selection in accordance with one or more embodiments of the disclosure.

At block 552, a PRU may establish a connection with a PTU using one or more communication protocols. Establishing a connection may include performing a handshake procedure for exchanging identification information between the device and the PTU. The one or more communication protocols include at least one of a Bluetooth Low Energy (BLE), near field communication (NFC), in-band modulation, Wi-Fi, or any other communication protocols that may be used for communicating between two devices.

At block 554, the PRU may determine one or more parameters associated with the PRU. The one or more parameters may include temperature parameters, current parameters, or voltage parameters. For example, the temperature parameters may include a minimum temperature, a maximum temperature, or an instantaneous temperature of the PRU. The minimum temperature and the maximum temperature may be determined by various factors, such as category of the PRU, specifications, manufacturing information, size of the PRU, etc. The instantaneous temperature may be determined at various intervals.

The current parameters may be determined by the PRU based at least in part on rectifier current and maximum current values of a PRU. Additionally/alternatively, the voltage parameters may be determined by the PRU based at least in part on a value of $V_{RECT\_HIGH}$ and $V_{RECT}$, where $V_{RECT}$ is a rectifier voltage of a PRU and $V_{RECT\_HIGH}$ is a high rectifier voltage of a PRU.

At block 556, the PRU may send the one or more parameters to the PTU. The one or more parameters may be utilized by the PTU to evaluate at least one of a temperature ratio, a current ratio, or voltage information. For example, the PRU may advertise through, for example, Bluetooth Low Energy (BLE) or in-band modulation. The PRU category information may be transferred to the PTU as static or dynamic PRU parameters. It is understood that although advertisement is done through BLE or in-band modulation, any other communication protocols that may be used for communicating between two devices may be used. The PTU may use that information to evaluate a ratio of $(t-T_{MIN})/(T_{MAX}-T_{MAX})$, as the dominant PRU, where t is the instantaneous PRU temperature and $T_{MIN}$ and $T_{MAX}$ are minimum and maximum PRU temperatures. Based on the value of the temperature ratio, the PTU may determine whether the PRU is a dominant PRU or not. The PTU may also rely on other criteria (e.g., current ratio criterion and/or voltage gap criterion) in order to determine whether the PRU is a dominant PRU. For example, the PTU may select the PRU with the highest $I_{RECT}$ to $I_{MAX}$ ratio as a dominant PRU. In another example, the PTU may determine that the dominant PRU is the PRU with the smallest value of $V_{RECT\_HIGH}-V_{RECT}$, where $V_{RECT}$ is a rectifier voltage of a PRU and $V_{RECT\_HIGH}$ is a high rectifier voltage of a PRU.

At block 558, the PRU may receive an indication from the PTU that the PRU is a dominant PRU. This indication may be deterministic of the current that may be received from the PTU after the PTU performs current adjustment based at least in part on the dominant PRU.

Figure 6:
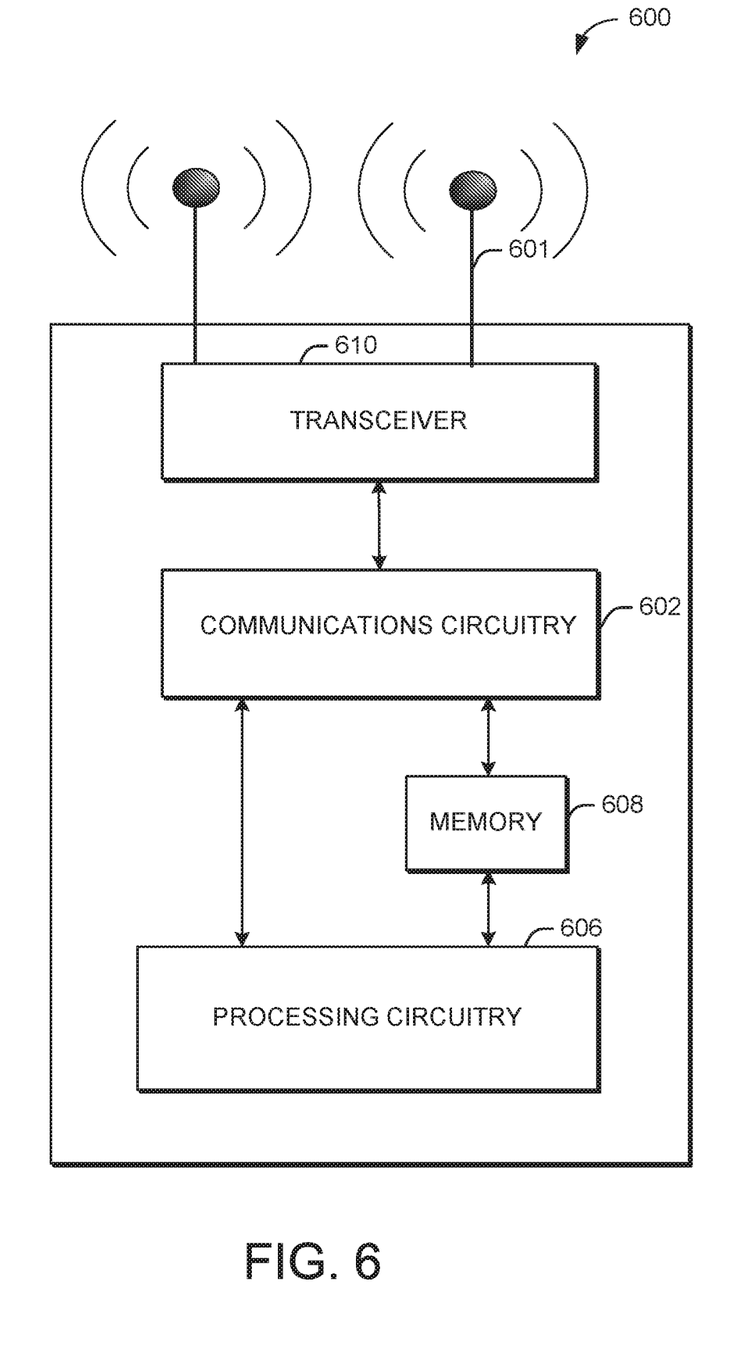
FIG. 6 illustrates a functional diagram of an example communication station that may be suitable for use as a user device, in accordance with one or more example embodiments of the disclosure.

FIG. 6 shows a functional diagram of an exemplary communication station 600 in accordance with some embodiments. In one embodiment, FIG. 6 illustrates a functional block diagram of a communication station that may be suitable for use as a PTU 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a High Data Rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform the operations detailed in FIGS. 2, 3, 4A, 4B, 5A, and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices, and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs) and/or other hardware elements. For example, some elements may include one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

Figure 7:
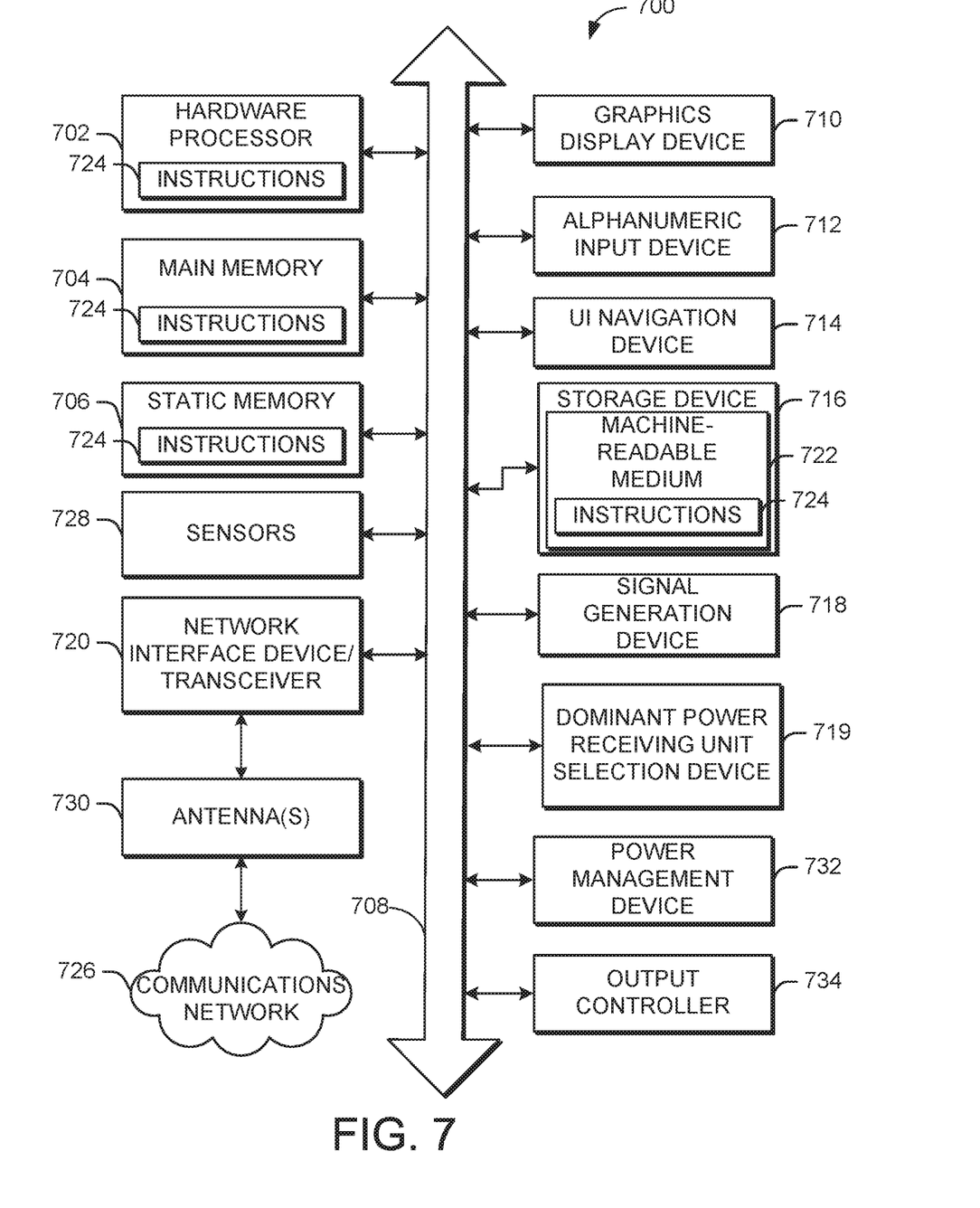
FIG. 7 is a block diagram of an example machine upon which any of one or more techniques (e.g., methods) may be performed, in accordance with one or more embodiments of the disclosure.

FIG. 7 illustrates a block diagram of an example machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, the alphanumeric input device 712, and the UI navigation device 714 may be a touch screen display. The machine 700 may additionally include a storage device (i.e., drive unit) 716, a signal generation device 718 (e.g., a speaker), a dominant power receiving unit selection device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The dominant power receiving unit selection device 719 may carry out or perform any of the operations and processes (e.g., processes 500 and 550) described and shown above. For example, the dominant power receiving unit selection device 719 may be configured to facilitate the selection of PRUs based at least in part on one or more criteria including at least in part a temperature criterion, a current criterion, and/or a voltage gap criterion. These criteria may be determined based on PRU device category information, with the goal of maximizing the selection efficiency of a dominant PRU relative to other PRUs that may be in the proximity of the charging area of a PTU.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random access memory (RAM), magnetic disk storage media, optical storage media, a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device," and "user equipment" (UE) as used herein refers to a wireless communication device such as a cellular telephone, a smartphone, a tablet, a netbook, a wireless terminal, a laptop computer, a femtocell, a High Data Rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one-way and/or two-way radio communication systems, cellular radio-telephone communication systems, a mobile phone, a cellular telephone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee™, ultra-wideband (UWB), global system for mobile communication (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other devices, systems, and/or networks.

In example embodiments of the disclosure, there may be a device. The device may include at least one memory that stores computer-executable instructions; and at least one processor of one or more processors configured to access the at least one memory, wherein the at least one processor may be configured to execute the computer-executable instructions to determine a presence of a first device of one or more devices on a charging area of the device, the charging area including a power transmitting surface; establish a connection with the first device using one or more communication protocols; identify device information associated with the first device using the established connection; and determine that the first device is a dominant device based at least in part on the device information.

Implementations may include one or more of the following features. The device information may include at least in part a category of the device. The instructions to determine that the first device is a dominant device further include instructions to apply on the device information at least one of a temperature criterion, a current criterion, or a voltage criterion. The one or more communication protocols include at least one of a Bluetooth low energy (BLE), near field communication (NFC), in-band modulation, or Wi-Fi. The device further comprises a transceiver configured to transmit and receive wireless signals. The device further comprises an antenna coupled to the transceiver.

In example embodiments of the disclosure, there may be a non-transitory computer-readable medium. The non-transitory computer-readable medium may store computer-executable instructions which, when executed by a processor, cause the processor to perform operations comprising establishing a connection with a device with a power transmitting unit (PTU) using one or more communication protocols, identifying a request for device information associated with the device, and causing to send the device information to the PTU, the device information including at least one of a temperature ratio, a current ratio, or a voltage information.

Implementations may include one or more of the following features. The computer-executable instructions may cause the processor to further perform operations comprising causing a request to be sent to charge the device. The device information includes at least in part a category of the device. The computer-executable instructions may cause the processor to further perform operations comprising identifying an indication of a dominant device based at least in part on the device information. The one or more communication protocols include at least one of a Bluetooth Low Energy (BLE), near field communication (NFC), in-band modulation, or Wi-Fi. The operations to establish a connection include performing a handshake procedure for exchanging identification information with the PTU.

In example embodiments of the disclosure, there may be a method. The method may include determining, by a first device, a presence of a second device on a charging area of the first device, the charging area including a power transmitting surface, establishing a connection with the second device using one or more communication protocols, identifying device information associated with the second device using the established connection, and determining that the second device is a dominant device based at least in part on the device information.

Implementations may include one or more of the following features. The device information may include at least in part a category of the device. The one or more communication protocols include at least one of a Bluetooth Low Energy (BLE), near field communication (NFC), in-band modulation, or Wi-Fi. Establishing a connection may include performing a handshake procedure for exchanging identification information with the first device. Determining that the second device is a dominant device further may include applying to the device information, at least one of a temperature criterion, a current criterion, or a voltage criterion.

In example embodiments of the disclosure, there may be an apparatus. The apparatus may include means for determining a presence of a first device of one or more devices on a charging area of the device, the charging area including a power transmitting surface. The apparatus may include means for establishing a connection with the first device using one or more communication protocols. The apparatus may include means for identifying one or more parameters associated with the first device using the established connection. The apparatus may include means for determining that the first device is a dominant device based at least in part on the one or more parameters.

Implementations may include one or more of the following features. The one or more parameters are associated with a category of the first device. Operations further comprise means for transmitting charging power to the one or more devices based at least in part on the one or more parameters.

The one or more parameters include at least one of a temperature parameter, a current parameter, or a voltage parameter. The temperature parameter is based at least in part on a minimum temperature of the first device and a maximum temperature of the first device. The current parameter is based at least in part on a ratio of a rectifier current of the first device and a maximum current of the first device. The voltage parameter is based at least in part on a difference between a high rectifier voltage of the first device and a rectifier voltage of the first device. The one or more communication protocols include at least one of a Bluetooth Low Energy (BLE), Near Field Communication (NFC), in-band modulation, or Wi-Fi.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A power transmitting unit (PTU) for selecting a dominant power receiving unit (PRU), the PTU comprising storage and processing circuitry, the processing circuitry coupled to storage, the processing circuitry configured to:
   determine a presence of a first PRU placed in a charging area of the PTU, wherein the first PRU is associated with a first device category;
   determine a presence of a second PRU placed in the charging area of the device, wherein the second PRU is associated with a second device category different from the first device category; and
   select the first PRU as a dominant PRU based at least in part on a selection criteria associated with the first PRU and the second PRU, wherein the selection criteria is based on a temperature ratio.

2. The PTU of claim 1, wherein the selection criteria is based at least in part on a rectifier power ratio or a rectifier voltage.

3. The PTU of claim 1, wherein the processing circuitry is further configured to:
   determine a first rectifier power ratio based on a first rectifier power associated with the first PRU and a maximum rectifier power of the PRU; and
   determine a second rectifier power ratio based on a second rectifier power associated with the second PRU and a maximum rectifier power of the PRU; and
   determine the first rectifier power ratio is greater than the second rectifier power ratio.

4. The PTU of claim 1, wherein the processing circuitry is further configured to:
   determine a first temperature ratio associated with the first PRU;
   determine a second temperature ratio associated with the second PRU; and
   determine the first temperature ratio is greater than the second temperature ratio.

5. The PTU of claim 1, wherein the processing circuitry is further configured to:
   determine a first rectifier voltage associated with the first PRU;
   determine a second rectifier voltage associated with the second PRU; and select the dominant PRU based on the first rectifier voltage and the second rectifier voltage.

6. The PTU of claim 1, wherein the processing circuitry is further configured to identify one or more first parameters received from the first PRU, wherein the one or more first parameters comprise a first PRU rectifier voltage, a first PRU rectifier current, a first PRU temperature ratio, or a first PRU current ratio.

7. The PTU of claim 1, wherein the processing circuitry is further configured to identify one or more second parameters received from the second PRU, wherein the one or more second parameters comprise a second PRU rectifier voltage, a second PRU rectifier current, a second PRU temperature ratio, or a second PRU current ratio.

8. The PTU of claim 1, further comprising a transceiver configured to transmit and receive wireless signals.

9. The PTU of claim 8, further comprising an antenna coupled to the transceiver to cause to send the frame.

10. A non-transitory computer-readable medium storing computer-executable instructions which when executed by one or more processors result in performing operations comprising:
    determining a presence of a first power receiving unit (PRU) placed in a charging area of a power transmitting unit (PTU), wherein the first PRU is associated with a first device category;
    determining a presence of a second PRU placed in the charging area of the device, wherein the second PRU is associated with a second device category different from the first device category; and
    selecting the first PRU as a dominant PRU based at least in part on a selection criteria associated with the first PRU and the second PRU, wherein the selection criteria is based on a temperature ratio.

11. The non-transitory computer-readable medium of claim 1, wherein the selection criteria is based at least in part on a rectifier power ratio or a rectifier voltage.

12. The non-transitory computer-readable medium of claim 10, wherein the operations further comprise:
    determining a first rectifier power ratio based on a first rectifier power associated with the first PRU and a maximum rectifier power of the PRU; and
    determining a second rectifier power ratio based on a second rectifier power associated with the second PRU and a maximum rectifier power of the PRU; and
    determining the first rectifier power ratio is greater than the second rectifier power ratio.

13. The non-transitory computer-readable medium of claim 10, wherein the operations further comprise:
    determining a first temperature ratio associated with the first PRU;
    determining a second temperature ratio associated with the second PRU; and
    determining the first temperature ratio is greater than the second temperature ratio.

14. The non-transitory computer-readable medium of claim 10, wherein the operations further comprise:
    determining a first rectifier voltage associated with the first PRU;
    determining a second rectifier voltage associated with the second PRU; and
    selecting the dominant PRU based on the first rectifier voltage and the second rectifier voltage.

15. The non-transitory computer-readable medium of claim 10, wherein the operations further comprise identifying one or more first parameters received from the first PRU, wherein the one or more first parameters comprise a first PRU rectifier voltage, a first PRU rectifier current, a first PRU temperature ratio, or a first PRU current ratio.

16. The non-transitory computer-readable medium of claim 1, wherein the operations further comprise identifying one or more second parameters received from the second PRU, wherein the one or more second parameters comprise a second PRU rectifier voltage, a second PRU rectifier current, a second PRU temperature ratio, or a second PRU current ratio.

17. A method comprising:
    determining, by one or more processors, a presence of a first power receiving unit (PRU) placed in a charging area of the power transmitting unit (PTU), wherein the first PRU is associated with a first device category;
    determining a presence of a second PRU placed in the charging area of the device, wherein the second PRU is associated with a second device category different from the first device category; and
    selecting the first PRU as a dominant PRU based at least in part on a selection criteria associated with the first PRU and the second PRU, wherein the selection criteria is based on a temperature ratio.

18. The method of claim 17, wherein the selection criteria is based at least in part on a rectifier power ratio or a rectifier voltage.

19. The method of claim 17, further comprising:
    determining a first rectifier power ratio based on a first rectifier power associated with the first PRU and a maximum rectifier power of the PRU; and
    determining a second rectifier power ratio based on a second rectifier power associated with the second PRU and a maximum rectifier power of the PRU; and
    determining the first rectifier power ratio is greater than the second rectifier power ratio.

20. The method of claim 17, further comprising:
    determining a first temperature ratio associated with the first PRU;
    determining a second temperature ratio associated with the second PRU; and
    determining the first temperature ratio is greater than the second temperature ratio.

* * * * *